United States Patent
Brott et al.

(10) Patent No.: US 7,800,708 B2
(45) Date of Patent: Sep. 21, 2010

(54) STEREOSCOPIC 3D LIQUID CRYSTAL DISPLAY WITH SEGMENTED LIGHT GUIDE

(75) Inventors: Robert L. Brott, Woodbury, MN (US); Dale L. Ehnes, Cotati, CA (US); David J. Lundin, Woodbury, MN (US); Michael A. Meis, Stillwater, MN (US); John C. Nelson, The Sea Ranch, CA (US)

(73) Assignee: 3M Innovative Properties Company, Saint Paul, MN (US)

( * ) Notice: Subject to any disclaimer, the term of this patent is extended or adjusted under 35 U.S.C. 154(b) by 422 days.

(21) Appl. No.: 11/866,017

(22) Filed: Oct. 2, 2007

(65) Prior Publication Data

US 2008/0084513 A1 Apr. 10, 2008

Related U.S. Application Data

(60) Provisional application No. 60/828,399, filed on Oct. 6, 2006.

(51) Int. Cl.
*G02F 1/1335* (2006.01)
*G01D 11/28* (2006.01)
*F21V 7/04* (2006.01)

(52) U.S. Cl. ............... 349/61; 349/62; 349/64; 349/65; 362/26; 362/27; 362/29; 362/30; 362/600; 362/602; 362/611; 362/612; 362/613; 362/615; 362/616

(58) Field of Classification Search .......... 349/61, 349/62, 64, 65; 362/26, 27, 29–30, 225, 362/600, 602, 611, 612, 615–616
See application file for complete search history.

(56) References Cited

U.S. PATENT DOCUMENTS

| 5,432,876 A | 7/1995 | Appeldorn et al. |
| 5,845,038 A | 12/1998 | Lundin et al. |
| 5,894,539 A | 4/1999 | Epstein |

(Continued)

FOREIGN PATENT DOCUMENTS

JP 2005-266293 9/2005

(Continued)

OTHER PUBLICATIONS

Ishikawa et al. "New Design for a Highly Collimating Turning Film," Eastman Kodak Company, SID 06 Digest, p. 514-517, 2006.

*Primary Examiner*—Hoan C Nguyen

(57) ABSTRACT

A backlight for a stereoscopic 3D liquid crystal display apparatus includes a light guide formed from a plurality of segments. Each segment has a first side and a second side opposite the first side, and a first surface extending between the first and second sides and a second surface opposite the first surface. The first surface substantially re-directs light and the second surface substantially transmits light. The plurality of segments are arranged substantially in parallel with the second surfaces transmitting light in substantially the same direction to provide backlighting for a stereoscopic 3D liquid crystal display. A light source is disposed along only one of the first side or second side of each segment for transmitting light into the light guide from either the first side or second side. Each segment light source is selectively turned on and off in a particular pattern.

20 Claims, 2 Drawing Sheets

U.S. PATENT DOCUMENTS

| | | |
|---|---|---|
| 5,897,184 A | 4/1999 | Eichenlaub et al. |
| 5,929,951 A | 7/1999 | Sasakura et al. |
| 6,271,896 B2 | 8/2001 | Moseley et al. |
| 6,367,941 B2 | 4/2002 | Lea |
| 6,473,141 B2 | 10/2002 | Moseley et al. |
| 6,618,530 B1 | 9/2003 | Lundin |
| 6,746,129 B2 * | 6/2004 | Ohkawa .................. 362/625 |
| 6,831,624 B1 | 12/2004 | Harrold |
| 6,970,290 B1 | 11/2005 | Mashitani et al. |
| 7,057,638 B1 | 6/2006 | Yuuki et al. |
| 7,210,836 B2 | 5/2007 | Sasagawa et al. |
| 7,413,330 B2 * | 8/2008 | Furukawa ................ 362/600 |
| 7,515,223 B2 * | 4/2009 | Lee et al. ................ 349/61 |
| 7,530,721 B2 | 5/2009 | Mi et al. |
| 2001/0001566 A1 | 5/2001 | Moseley et al. |
| 2002/0005921 A1 | 1/2002 | Sasakura et al. |
| 2002/0126389 A1 | 9/2002 | Moseley et al. |
| 2004/0046910 A1 | 3/2004 | Sasakura et al. |
| 2004/0130884 A1 | 7/2004 | Yoo et al. |
| 2005/0052750 A1 | 3/2005 | King et al. |
| 2005/0073625 A1 | 4/2005 | Daiku et al. |
| 2005/0140270 A1 | 6/2005 | Henson et al. |
| 2005/0276071 A1 | 12/2005 | Sasagawa et al. |
| 2005/0280894 A1 | 12/2005 | Hartkop et al. |
| 2006/0050047 A1 * | 3/2006 | Jin et al. .................. 345/102 |
| 2006/0132673 A1 | 6/2006 | Ito et al. |
| 2007/0126691 A1 | 6/2007 | Lin et al. |

FOREIGN PATENT DOCUMENTS

| | | |
|---|---|---|
| WO | WO 2004/008226 | 1/2004 |
| WO | WO 2004/027492 | 4/2004 |
| WO | WO 2005/088599 | 9/2005 |

* cited by examiner

STEREOSCOPIC 3D LIQUID CRYSTAL DISPLAY WITH SEGMENTED LIGHT GUIDE

CROSS-REFERENCE TO RELATED APPLICATION

This application claims the benefit of U.S. Provisional Application Ser. No. 60/828,399 filed Oct. 6, 2006.

FIELD

The present disclosure relates to a backlit liquid crystal display apparatus and particularly to displaying stereo 3D images using a liquid crystal display with a segmented light guide.

BACKGROUND

A stereoscopic 3D display usually presents an observer with images with parallax from individual right and left eye viewpoints. There are two methods of providing the two eyes of the observer with the parallax images in a time sequential manner. In one method, the observer utilizes a pair of shutter or 3D glasses which transmit or block light from the viewer's eyes in synchronization with alternating the left/right image display. Similarly, in another method, right eye and left eye viewpoints are alternatively displayed and presented to the respective eyes of the observer but without the use of 3D glasses. This second method is referred to as autostereoscopic and is sometimes desirable for stereo 3D viewing because separate glasses are not needed though there is limited permissible head motion.

A liquid crystal display (LCD) is a sample and hold display device such that the image at any point or pixel of the display is stable until that pixel is updated at the next image refresh time, typically 1/60 of a second or faster. In such a sample and hold system, displaying different images, specifically displaying alternating left and right images for an autostereoscopic display, requires careful timing sequencing of the light sources so that, for example, the left eye image light source is not on during the display of data for the right eye and vice versa.

Turning on the light source to light the first or right image at time t=0 provides light to the right image. At time t=16.67 ms (typical 60 Hz refresh rate) the second or left image starts to be put in place. The second image replaces the first image and can take 16.67 ms to complete the transformation. Current systems turn off all the light sources that illuminate the first or right image and then turn on all the light sources that illuminate the second or left image at sometime during the second image transformation. This can lead to "cross-talk" or "ghosting" of the first or right image in the second or left image, degrading the stereoscopic 3D effect. An additional source of crosstalk in current systems is light reflection from a left or right source off of the opposite source window backwards toward the original source.

BRIEF SUMMARY

The present disclosure relates to a backlit liquid crystal display apparatus and particularly to displaying stereo 3D images using a liquid crystal display with a segmented light guide.

In a first embodiment, a backlight for a stereoscopic 3D liquid crystal display apparatus includes a light guide formed from a plurality of segments. Each segment has a first side and a second side opposite the first side, and a first surface extending between the first and second sides and a second surface opposite the first surface. The first surface substantially redirects light and the second surface substantially transmits light. The plurality of segments are arranged substantially in parallel with the second surfaces transmitting light in substantially the same direction to provide backlighting for a stereoscopic 3D liquid crystal display. A light source is disposed along only one of the first side or second side of each segment for transmitting light into the light guide from either the first side or second side. Each segment light source is selectively turned on and off in a particular pattern.

In another embodiment, a stereoscopic 3D liquid crystal display apparatus includes a liquid crystal display panel, drive electronics configured to drive the liquid crystal display panel with alternating left eye and right eye images, and a backlight positioned to provide light to the liquid crystal display panel. The backlight includes a light guide formed from a plurality of segments. Each segment has a first side and a second side opposite the first side, and a first surface extending between the first and second sides and a second surface opposite the first surface. The first surface substantially redirects light and the second surface substantially transmits light. The plurality of segments are arranged substantially in parallel with the second surfaces transmitting light in substantially the same direction to provide backlighting for a stereoscopic 3D liquid crystal display. A light source is disposed along only one of the first side or second side of each segment for transmitting light into the light guide from either the first side or second side. Each segment light source is selectively turned on and off in a particular pattern.

BRIEF DESCRIPTION OF THE DRAWINGS

The invention may be more completely understood in consideration of the following detailed description of various embodiments of the invention in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
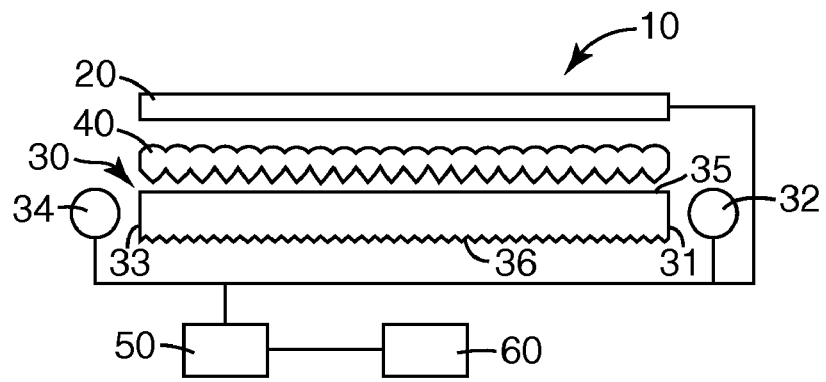
FIG. 1 is a schematic side view of an illustrative display apparatus.

In the following description, reference is made to the accompanying drawings that form a part hereof, and in which are shown by way of illustration several specific embodiments. It is to be understood that other embodiments are contemplated and may be made without departing from the scope or spirit of the present invention. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

The term "autostereoscopic" refers to displaying three-dimensional images that can be viewed without the use of special headgear or glasses on the part of the user or viewer. These methods produce depth perception for the viewer even though the image is produced by a flat device. The term stereoscopic 3D incorporates the field of autostereoscopic devices but also includes the stereoscopic 3D display case in which special headgear, typically shutter glasses, are need to see stereoscopic 3D from a flat device.

The present disclosure relates to a backlit liquid crystal display apparatus and particularly to displaying stereo 3D images using a liquid crystal display with a segmented light guide. This apparatus can provide a spatially controlled, variable intensity light source formed from horizontally arranged zones of light. In many embodiments, these segmented backlights utilize segments of channels that are interleaved, where adjacent segment or channel pairs are lit from opposite sides of the light guide. These segments or channels are arranged such that adjacent segment or channel segments have an alternating right and left light directionality.

Ghosting is created when all or a portion of the LCD panel has not been completely erased of the previous image and the directional backlight is switched. For example, if the left image is displayed with the left image light source, ghosting will occur if the right image light source is turned on before the display is either made black or the right image becomes stable on the display.

This segmented backlight provides alternating right and left light directionality for adjacent backlight channels or segments, reduces image "cross-talk" or image "ghosting" in autostereoscopic 3D displays. These segmented light guides can thus be designed to extract most if not nearly all of the light from the light guide with a single pass through each channel or segment. Light emitting diodes can be utilized at a single end of each channel or segment to illuminate the edge of the thin, narrow channel or segment of a light guide. In some embodiments, time sequencing each horizontal zone (plurality of adjacent segments) can provide a scanning backlight solution. In these embodiments, the zones of the light guide can have a width that is sized relative to the LCD panel response time to that the entire backlight, are completely lit within one display refresh. In some embodiments, one or more zones are sequentially lit in synchronization with the display.

One or more of these embodiments may be combined in a single display capable of providing a 3D visualization capability from a flat display either in a shutter glasses stereoscopic 3D display mode or in an autostereoscopic display mode. While the present invention is not so limited, an appreciation of various aspects of the invention will be gained through a discussion of the examples provided below.

A liquid crystal display is a sample and hold display device such that the image at any particular point is stable until that point or pixel is updated at the next image refresh time, typically within 1/60 of a second or faster. In such a sample and hold system, displaying different images, specifically alternating left and right images for a 3D display, during sequential refresh periods of the display requires careful sequencing of the backlight light sources so that, for example, the left eye light source is not on during the display of data for the right eye and vice versa.

FIG. 1 is a schematic side view of an illustrative display apparatus 10. The display apparatus includes a liquid crystal display panel 20 and a backlight 30 positioned to provide light to the liquid crystal display panel 20. The backlight 30 includes a right eye image solid state light source 32 or plurality of first light sources 32, and a left eye image solid state light source 34 or plurality of second light sources 34, capable of being modulated between the right eye image solid state light source 32 and the left eye image solid state light source 34 at a rate of, in many embodiments, at least 90 Hertz. A double sided prism film 40 is disposed between the liquid crystal display panel 20 and the backlight 30.

The liquid crystal display panel 20 and/or backlight 30 can have any useful shape or configuration. In many embodiments, the liquid crystal display panel 20 and backlight 30 has a square or rectangular shape. However, in some embodiments, the liquid crystal display panel 20 and/or backlight 30 has more than four sides or is a curved shape. While the present disclosure is directed to any stereoscopic 3D backlight including those requiring shutter glasses or more than a single lightguide and associated liquid crystal display panel, the present disclosure is particularly useful for autostereoscopic displays.

A synchronization driving element 50 is electrically connected to the backlight 30 plurality of first and second light sources 32, 34 and the liquid crystal display panel 20. The synchronization driving element 50 synchronizes activation and deactivation (i.e., modulation) of the right eye image solid state light source 32 and the left eye image solid state light source 34 as image frames are provided at a rate of, in many embodiments, 90 frames per second or greater to the liquid crystal display panel 20 to produce a flicker-free still image sequence, video stream or rendered computer graphics. An image (e.g., video or computer rendered graphics) source 60 is connected to the synchronization driving element 50 and provides the images frames (e.g., right eye images and left eye images) to the liquid crystal display panel 20.

The liquid crystal display panel 20 can be any useful transmissive liquid crystal display panel. In many embodiments, liquid crystal display panel 20 has a frame response time of less than 16 milliseconds, or less than 10 milliseconds, or less than 5 milliseconds. Commercially available transmissive liquid crystal display panels having a frame response time of less than 10 milliseconds, or less than 5 milliseconds, or less than 3 milliseconds, are for example Toshiba Matsushita Display's (TMD) optically compensated bend (OCB) mode panel LTA090A220F (Toshiba Matsushita Display Technology Co., Ltd., Japan).

The backlight 30 can be any useful backlight that can be modulated between a right eye image solid state light source 32 and left eye image solid state light source 34 at a rate of, in many embodiments, at least 90 Hertz, or 100 Hertz, or 110 Hertz, or 120 Hertz, or greater than 120 Hertz.

The illustrated backlight 30 includes a first side 31 or first light input surface 31 adjacent to the plurality of first light sources 32 or right eye image solid state light source 32 and an opposing second side 33 or second light input surface 33 adjacent to the plurality of second light sources 34 or left eye image solid state light source 34. A first surface 36 extends between the first side 31 and second side 33, and a second surface 35, opposite the first surface 36, extends between the first side 31 and second side 33. The first surface 36 substantially re-directs (e.g., reflects, extracts, and the like) light and the second surface 35 substantially transmits light. In many embodiments, a highly reflective surface is on or adjacent to the first surface 36 to assist in re-directing light out through the second surface 35.

In many embodiments, the first surface 36 includes a plurality of extraction elements such as, for example, linear prism or lenticular features as shown. In many embodiments, the linear prism or lenticular features can extend in a direction parallel to the first side 31 and second side 33 or parallel to the linear prism and lenticular features of the double sided prism film 40.

The solid state light sources can be any useful solid state light source that can be modulated at a rate of, for example, at least 90 Hertz. In many embodiments, the solid state light source is a plurality of light emitting diodes such as, for example, Nichia NSSW020B (Nichia Chemical Industries, Ltd., Japan). In other embodiments, the solid state light source is a plurality of laser diodes or organic light emitting diodes (i.e., OLEDs). The solid state light sources can emit any number of visible light wavelengths such as red, blue, and/or green, or range or combinations of wavelengths to produce, for example, white light. The backlight can be a single layer of optically clear material with light sources at both ends or two (or more) layers of optically clear material with a light source per layer which preferentially extract light in a desired direction for each layer.

The double sided prism film 40 can be any useful prism film having a linear lenticular structure on a first side and a linear prismatic structure on an opposing side. The linear lenticular structure and the linear prism structure are parallel. The double sided prism film 40 transmits light from the scanning backlight to the liquid crystal display panel 20 at the proper angles such that a viewer perceives depth in the displayed image. Useful, double sided prism films are described in United States Patent Publication Nos. 2005/0052750 and 2005/0276071, which are incorporated herein to the extent they do not conflict with the present disclosure.

The image source 60 can be any useful image source capable of providing images frames (e.g., right eye images and left eye images) such as, for example, a video source or a computer rendered graphic source. In many embodiments, the video source can provide image frames from 50 to 60 Hertz or greater. In many embodiments, the computer rendered graphic source can provide image frames from 100 to 120 Hertz or greater.

The computer rendered graphic source can provide gaming content, medical imaging content, computer aided design content, and the like. The computer rendered graphic source can include a graphics processing unit such as, for example, an Nvidia FX5200 graphics card, a Nvidia GeForce 9750 GTX graphics card or, for mobile solutions such as laptop computers, an Nvidia GeForce GO 7900 GS graphics card. The computer rendered graphic source can also incorporate appropriate stereo driver software such as, for example, OpenGL, DirectX, or Nvidia proprietary 3D stereo drivers.

The video source can provide video content. The video source can include a graphics processing unit such as, for example, an Nvidia Quadro FX1400 graphics card. The video source can also incorporate appropriate stereo driver software such as, for example, OpenGL, DirectX, or Nvidia proprietary 3D stereo drivers.

The synchronization driving element 50 can include any useful driving element providing synchronizing activation and deactivation (i.e., modulation) of the right eye image solid state light source 32 and the left eye image solid state light source 34 with image frames provided at a rate of, for example, 90 frames per second or greater to the liquid crystal display panel 20 to produce a flicker-free video or rendered computer graphics. The synchronization driving element 50 can include a video interface such as, for example, a Westar VP-7 video adaptor (Westar Display Technologies, Inc., St. Charles, Mo.) coupled to custom solid state light source drive electronics.

Figure 2A:
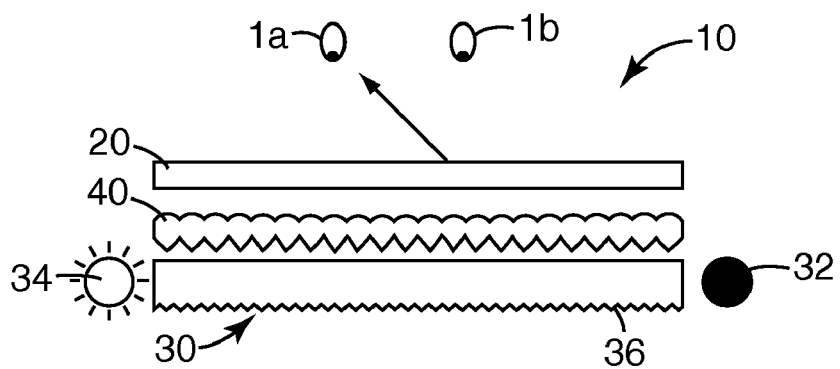
FIG. 2A and FIG. 2B are schematic side views of an illustrative display apparatus in operation.
Figure 2B:
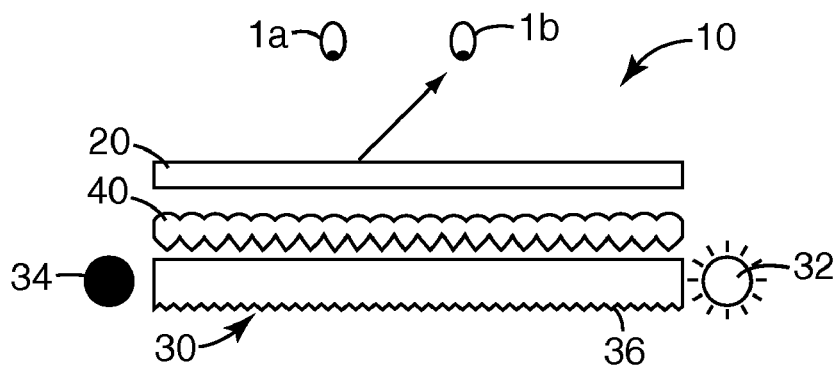

FIG. 2A and FIG. 2B are schematic side views of an illustrative display apparatus 10 in operation. In FIG. 2A the left eye image solid state light source 34 (i.e., plurality of second light sources 34) is illuminated and the right eye image solid state light source 32 (i.e., plurality of first light sources 32) is not illuminated. In this state, the light emitted from the left eye image solid state light source 34 transmits through the backlight 30, through the double sided prism sheet 40, and liquid crystal panel 20 providing a left eye image directed toward the left eye 1a of an viewer or observer. In FIG. 2B the right eye image solid state light source 32 is illuminated and the left eye image solid state light source 34 is not illuminated. In this state, the light emitted from the right eye solid state light source 32 transmits through the backlight 30, through the double sided prism sheet 40, and liquid crystal panel 20 providing a right eye image directed toward the right eye 1b of an viewer or observer. It is understood that while the right eye solid state light source 32 is located on the right side of the light guide and the left eye image solid state light source 34 is located on the left side of the light guide, is some embodiments, the right eye solid state light source 32 is located on the left side of the light guide and the left eye image solid state light source 34 is located on the right side of the light guide.

The light sources 32, 34 can be air coupled or index matched to the backlight light guide. For example, a packaged light source device (e.g., LED) can be edge-coupled without index matching material into the light guide. Alternatively, packaged or bare die LEDs can be index matched and/or encapsulated in the edge of the light guide for increased efficiency. This feature may include additional optical features, e.g., injection wedge shapes, on the ends of the light guide to efficiently transport the input light. The LEDs can be alternatively embedded in the edge or side 31, 33 of the light guide with appropriate features to efficiently collect and collimate the LED light into TIR (i.e., total internal reflection) modes of the light guide.

Liquid crystal display panels 20 have a refresh or image update rate that is variable, but for the purposes of this example, a 60 Hz refresh rate is presumed. This means that a new image is presented to the viewer every $\frac{1}{60}$ second or 16.67 milliseconds (msec). In the 3D system this means that at time t=0 (zero) the right image of frame one is presented. At time t=16.67 msec the left image of frame one is presented. At time t=2*16.67 msec the right image of frame two is presented. At time t=3*16.67 msec the left image of frame two is presented, and this process is thus repeated. The effective frame rate is half that of a normal imaging system because for each image a left eye and right eye view of that image is presented.

In this example, turning the first plurality of light sources on to light the right (or left) image at time t=0 provides light to the right (or left) image, respectively. At time t=16.67 msec the second image left or right, starts to be put in place. This image replaces the "time t=0 image" from the top of the LCD panel to the bottom of the LCD, which takes 16.67 msec to complete in this example. Non-scanned solutions turn off all the first plurality of light sources and then turns on all the second plurality of light sources sometime during this transition.

Providing at least 45 left eye images and at least 45 right eye images (alternating between right eye and left eye images and the images are possibly a repeat of the previous image pair) to a viewer per second provides a flicker-free 3D image to the viewer. Accordingly, displaying different right and left viewpoint image pairs from computer rendered images or images acquired from still image cameras or video image cameras, when displayed in synchronization with the switching of the light sources 32 and 34, enables the viewer to visually fuse the two different images, creating the perception of depth from the flat panel display. A limitation of this visually flicker-free operation is that, as discussed above, the backlight should not be on until the new image that is being displayed on the liquid crystal display panel has stabilized; otherwise cross-talk and a poor stereoscopic image will be perceived.

The segmented backlight 30 and associated light sources 32, 34 described herein can be very thin (thickness or diameter) such as, for example, less then 5 millimeters, or from 0.25 to 5 millimeters, or from 0.5 to 4 millimeters, or from 0.5 to 2 millimeters.

Figure 3A:
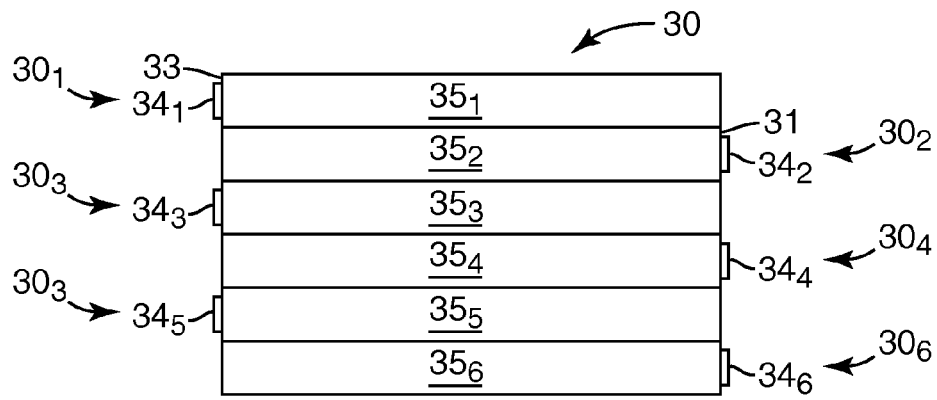
FIG. 3A is a schematic diagram front view of an illustrative backlight for displaying alternating right and left images.
Figure 3B:
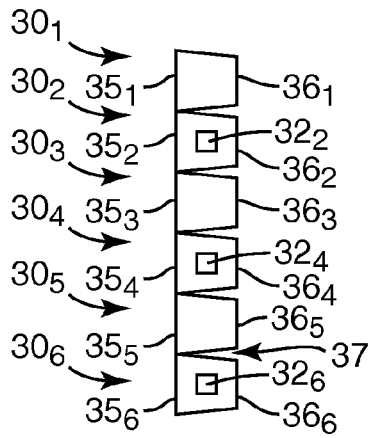
FIG. 3B is a side elevation view of the illustrative backlight of FIG. 3A.

FIG. 3A is a schematic diagram front view of an illustrative backlight 30 for displaying alternating right and left images. FIG. 3B is a side elevation view of the illustrative backlight of FIG. 3A. The backlight 30 is formed from a plurality of segments $30_1, 30_2, 30_3, 30_4, 30_5$, and $30_6$. First side light input segments $30_2, 30_4, 30_6$ and second side light input segments $30_1, 30_3, 30_5$ are interleaved such that adjacent segments $30_1, 30_2, 30_3, 30_4, 30_5, 30_6$ alternate between first side light input segments $30_2, 30_4, 30_6$ and second side light input segments $30_1, 30_3, 30_5$. Thus, the backlight 30 provides right eye image view light and left eye image view light in separate adjacent segments. This de-coupled light right eye image view light and left eye image view light allows the segments to be designed to specifically transmit all or nearly all the light out of the segment, as opposed to each segment designed to transmit light both right eye image view light and left eye image view light.

Each first side light input segment $30_2, 30_4, 30_6$ includes a first side 31 or first light input surface 31 adjacent to the plurality of first light sources $32_2, 32_4, 32_6$ or right eye image solid state light source $32_2, 32_4, 32_6$ and an opposing second side 33. Each second side light input segment $30_1, 30_3, 30_5$ includes a second light input surface 33 adjacent to the plurality of second light sources $34_1, 34_3, 34_5$ or left eye image solid state light source $34_1, 34_3, 34_5$. A first surface ($36_6$ for example and also shown in FIG. 1 reference number 36) extends between the first side 31 and second side 33 and a second surface $35_1, 35_2, 35_3, 35_4, 35_5, 35_6$, opposite the first surface ($36_6$ for example), extends between the first side 31 and second side 33. The first surface ($36_6$ for example) substantially re-directs (e.g., reflects, extracts, and the like) light and the second surface $34_1, 34_2, 34_3, 34_4, 34_5, 34_6$ substantially transmits light to the double sided prism film and LCD panel, as described in FIG. 1.

Each segment $30_1, 30_2, 30_3, 30_4, 30_5, 30_6$ can be separated from each other with a gap 37, such as an air gap 37, for example. The gaps 37 can be formed by cutting or otherwise making gaps 37 that separate at least a portion of each segment thickness from an adjacent segment. These gaps 37 can be air gaps that at least partially optically separate adjacent segments from each other. These gaps 37 can be optical gaps that, for example, can be physical gaps filled with a material with a different index of refraction and/or absorption or scattering as compared to the bulk material of the light guide. As illustrated, the segments remained joined at the edges of the light guide to stiffen and support the segments structures.

FIG. 3B illustrates segments that are partially separated by an air gap 37 and partially joined to each other at the second surface. However, it is understood that the segments can be alternatively joined at the first surface, not shown. In other embodiments, segments are partially separated by an air gap 37 at both the second surface and the first surface, and partially joined to each other between the second surface and the first surface. In embodiments where the segments are partially joined to an adjacent segment, the joining thickness can be any useful percentage of the total thickness of the segments. In many embodiments, the joining thickness is a value in a range from 1 to 90% or from 1 to 50% or from 1 to 25%.

While six channels or segments $30_1, 30_2, 30_3, 30_4, 30_5, 30_6$ are shown, it is understood that any useful number of channel or segments $30_1, 30_2, 30_3, 30_4, 30_5, 30_6$ can be utilized to form the backlight 30.

Each segment $30_1, 30_2, 30_3, 30_4, 30_5, 30_6$ includes a light source on only one side 31 or 33 of each segment $30_1, 30_2, 30_3, 30_4, 30_5, 30_6$. In many embodiments, adjacent segment $30_1, 30_2, 30_3, 30_4, 30_5, 30_6$ pairs have the light source 32 or 34 opposing sides 31 or 33 of each segment $30_1, 30_2, 30_3, 30_4, 30_5, 30_6$. This configuration "de-couples" right eye image and left eye image light source from each other and assists in reducing image "cross-talk" or image "ghosting" on a 3D display.

The backlight can be formed by placing each segment next to each other and adhering the segments together or fixed in a parallel manner with all the second surfaces transmitting light in substantially the same direction to provide backlighting for the stereoscopic 3D liquid crystal display.

Thus, each segment includes a light source transmitting light into only one side of each segment, a light transmission surface and an opposing light re-directing surface extending between the segment first side and segment second side. The plurality of segments are arranged substantially in parallel and with the first surfaces transmitting light in substantially the same direction to provide backlighting for a stereoscopic 3D liquid crystal display. In many embodiments, the video or data signals drive the LCD panel in synchronization with sequential lighting of the segments or groups of segments down the display.

In many embodiments, the backlight 30 right eye image view segments or groups of adjacent segments are lit (by only one side) sequentially from the top of the display to the bottom of the display for a first image (e.g., a right eye view image) and then the backlight 30 left eye view segments or groups of adjacent segments are lit (by only one side) sequentially from the top of the display to the bottom of the display for a second image from (e.g., a left eye view image). A rolling segment can be unlit from either side to separate the right eye view image from the left eye view image.

Various mechanical support methods may be used to maintain the parallel alignment of the segments. A backing film, possibly with light extraction features and a highly reflective surface can be laminated to the segments. The backing material of thin metal can be used as both a structural support for this film layer if needed and as a thermal spreading and/or dispersion layer for the light sources. In some embodiments, the segments have film layers on both the first surface 36 and the second surface 35.

Figure 4:
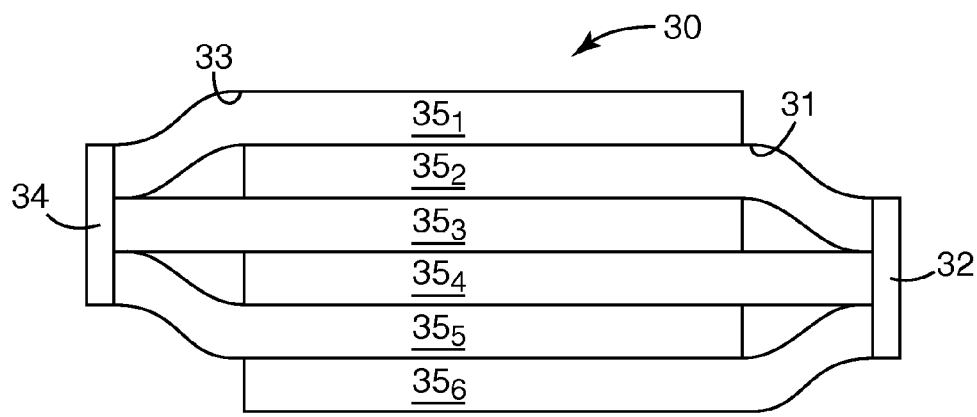
FIG. 4 is a schematic diagram front view of another illustrative backlight for displaying alternating right and left images.

FIG. 4 is schematic diagram front view of another illustrative backlight for displaying alternating right and left images. This backlight 30 is similar to the backlight described in FIG. 3A, however, this backlight 30 has a single light source 32 or 34 providing light to a plurality of segments.

Figure 5:
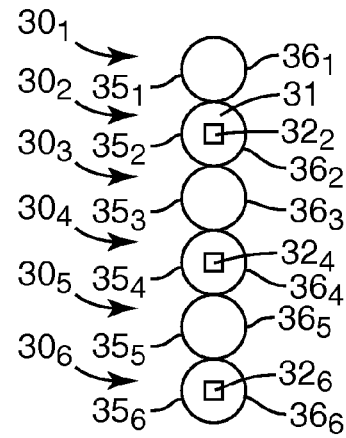
FIG. 5 is a schematic side elevation view of another illustrative backlight for displaying alternating right and left images.

FIG. 5 is a schematic side elevation view of another illustrative backlight for displaying alternating right and left images. This figure illustrates six segments $30_1, 30_2, 30_3, 30_4, 30_5, 30_6$ that have a circular cross-sectional shape and includes a first curved surface $36_1, 36_2, 36_3, 36_4, 36_5, 36_6$ and an opposing second curved surface $35_1, 35_2, 35_3, 35_4, 35_5, 35_6$. The FIG. 5 segments are elongated light rods. These elongated light rods have light extraction structures that direct the light out of the light transmission surface $35_1, 35_2, 35_3, 35_4, 35_5, 35_6$. Elongated light rods with extraction structures are described in U.S. Pat. Nos. 5,432,876; 5,845,038; and 6,367,941.

With the advent of small, high brightness light sources such as LEDs, these light rods can be used for backlighting the LCD panels. One advantage of these light sources, particularly LEDs, solid state lasers and OLEDs is the improved color gamut if red/green/blue and possibly additional colors such as white, cyan, magenta and yellow are used as the illumination source. Having an array of spaced LEDs supplying the light to the LCD panel has proven to provide sufficient illumination levels.

The light rod mimics the linear nature of fluorescent lamps by using solid state light sources with the linear light rod light guides. Commercially available LED packages, if bright enough, can simply be coupled into the linear light rods. For improved light injection, one may use a tapered light rod at the injection point to capture the wide angle light and change the angles to allow total internal reflection (TIR) into and down the light rod. If additional light from each light rod is needed or if one desires to incorporate red/green/blue as well as additional colors, for example, white, cyan, magenta and yellow, into the end of the light rod, one can use the features disclosed in U.S. Pat. No. 6,618,530, incorporated herein by reference, for combining light sources into a single light guide end. Another way to increase the amount of light is to combine several LED die, possibly coated with phosphor(s) emitting at different and/or broader wavelengths in close proximity to each other so that the overall light injected is cumulative. If allowed to space out the LED light sources along the length of the light guide rod, one could provide additional light to the linear light guide by periodically adding an LED injection site with the incorporation of a diverter into the side of the linear light rod.

One version of an elongated or linear light rod is the HL (high luminance) Light Fiber product (3M Company). Its construction is one of core and cladding. The core is an extremely clear acrylate surrounded by a fluoropolymer cladding. Additionally, the cladding is highly filled with $TiO_2$ for enhanced extraction of light. Although it has the right form factor, the extraction is around the whole diameter so additional materials may be needed to reflect light that is not aimed at the LCD panel. Another linear light guide could be the use of a clear PMMA rod. It is common to modify the rod shaped light guide with a stripe of white paint or other white material to extract light more aggressively in a preferred direction. One could vary the extraction rate down the length of the guide by changing the modification to the strip of material. Similarly, one could machine the stripe surface with extraction structures to accomplish the light extraction. If those extraction structures were engineered, optically smooth surfaces and close control of the extracted light are possible. This method is disclosed in the following US patents, all of which are incorporated herein by reference: U.S. Pat. Nos. 5,432,876; 5,845,038; and 6,367,941.

A tapered light guide for enhanced injection incorporates the angle provided by the taper and uses it to change the angle of the exiting light. The use of a harness coupler for having multiple LED injection into a given light guide is another method of transmitting multiple LED light into a linear light guide. The ability to pack many LED die into a tight package is disclosed in US Patent Application No. 2005/0140270, incorporated herein by reference. This method allows for increased brightness by the addition of many die within the cross sectional area of the rod shaped light guide. If the linear rod needs more light than what can be provided into the ends, light can be injected periodically along the length by using a type of diverter.

With the Light Fiber product (3M Company), one can get the linear rod form factor, but it may not be able to efficiently deliver light in a controlled fashion to a specific target. Additional films or coatings may be required to redirect light that is not directed to the LCD panel. Another way to create a linear light guide is to modify an acrylic rod. By roughening the surface or adding a white stripe of material down the length, one can extract light from the guide. Other ways include the use of a rectangular, light guide that employs optically smooth notches. This use for extracting light provides more efficient light extraction to the target and is disclosed in U.S. Pat. No. 5,894,539, incorporated herein by reference. For improved angular control, while still using TIR for extracting, one can use techniques disclosed in U.S. Pat. No. 5,845,038, incorporated herein by reference. By adding additional rows of notches, one can provide a wider cone of light, which helps provide uniform illumination to the back of the LCD panel. As shown in FIG. 5, the LED light rods can be used to form a scanning backlight assembly, which is controlled by an electronic system to deliver the scanning operation. The backlight includes several spaced light rods illuminated in sequence to provide the scanning function.

For all the described embodiments, each segment is lit with one or more light sources in any useful configuration. In many embodiments, each segment is lit with a single LED, and each segment is sized such that only one LED can fit either the first or second side 31, 33.

Each segment first or second side has any useful length and a width, or diameter value. In many embodiments, each segment first or second side has a length and a width, or diameter value of 2 millimeters or less. In many embodiments, each segment first or second side has a length and a width, or diameter value in a range from 0.5 millimeters to 2 millimeters. In some embodiments, each segment first or second side has a length and a width, or diameter value of 5 millimeters or less.

The segments or channels can be formed in any useful manner. In many embodiments, the segments or channels are formed by molding onto a master tool or machining. Molding methods such as injection molding or compression molding or web based microreplication may be used. If a thinner light guide with fine pitch sections is desired, several of the light guide sections may be joined together and illumined with a single source as shown in FIG. 4. Roll based fabrication processes may be used and are more amenable to finer features (one millimeter or less) feature sizes. Larger features can be manufactured from flat tools by injection molding or compression molding. Combinations of finely structured extractors or directional diffusers may also be laminated to courser light guide channels or segments made by another process. It is also possible to use approaches similar to those for fiber optic illuminators. In addition to using prism extractor features, the cross-section of the segmented light guide may decrease as a function of distance from the light source, forming a converging wedge or tapered light guide segment having the light source illuminating the wide side of the converging wedge. Such converging wedge segments extract light at high angles and may not need separate extraction features.

Thus, embodiments of the STEREOSCOPIC 3D LIQUID CRYSTAL DISPLAY APPARATUS WITH SEGMENTED LIGHT GUIDE are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A backlight for a stereoscopic 3D liquid crystal display apparatus, comprising:
   a light guide formed from a plurality of segments, each segment having a first side and a second side opposite the first side, and having a first surface extending between the first and second sides and a second surface opposite the first surface, wherein the first surface substantially re-directs light and the second surface substantially transmits light, and the plurality of segments are arranged substantially in parallel with the second surfaces transmitting light in substantially the same direction to provide backlighting for a stereoscopic 3D liquid crystal display;
   a light source is disposed along only one of the first side or second side of each segment for transmitting light into the light guide from either the first side or second side;
   wherein, each segment light source is selectively turned on and off in a particular pattern.

2. A backlight for a stereoscopic 3D liquid crystal display apparatus according to claim 1, wherein the light sources are located on opposing first and second sides of each pair of adjacent segments.

3. A backlight for a stereoscopic 3D liquid crystal display apparatus according to claim 1, wherein the segments include a graded extractor that provides substantially uniform extraction of light from the second surface.

4. A backlight for a stereoscopic 3D liquid crystal display apparatus according to claim 1, wherein each light source comprises a one or more light emitting diodes.

5. A backlight for a stereoscopic 3D liquid crystal display apparatus according to claim 1, wherein the segments have a converging wedge shape with the light source located at a wide side of the converging wedge.

6. A backlight for a stereoscopic 3D liquid crystal display apparatus according to claim 1, wherein each segment is partially separated from an adjacent segment by an air gap and each segment is joined with an adjacent segment at the first surface, or second surface, or between the first surface and second surface.

7. A backlight for a stereoscopic 3D liquid crystal display apparatus according to claim 1, wherein each segment is completely separated from an adjacent segment by an air gap.

8. A backlight for a stereoscopic 3D liquid crystal display apparatus according to claim 1, wherein each segment is completely separated from an adjacent segment.

9. A backlight for a stereoscopic 3D liquid crystal display apparatus according to claim 1, further comprising a synchronization driving element electrically coupled to the light sources and the synchronization driving element synchronizes turning each light source on or off in an alternating order between the first and second sides.

10. A backlight for a stereoscopic 3D liquid crystal display apparatus according to claim 1, wherein the plurality of segments comprise elongated rods.

11. A stereoscopic 3D liquid crystal display apparatus, comprising:
    a liquid crystal display panel;
    drive electronics configured to drive the liquid crystal display panel with alternating left eye and right eye images; and
    a backlight positioned to provide light to the liquid crystal display panel, the backlight comprising:
        a light guide formed from a plurality of segments, each segment having a first side and a second side opposite the first side, and having a first surface extending between the first and second sides and a second surface opposite the first surface, wherein the first surface substantially re-directs light and the second surface substantially transmits light, and the plurality of segments are arranged substantially in parallel with the second surfaces transmitting light in substantially the same direction to provide backlighting for a stereoscopic 3D liquid crystal display;
        a light source is disposed along only one of the first side or second side of each segment for transmitting light into the light guide from either the first side or second side;
    wherein, each segment light source is selectively turned on and off in a particular pattern.

12. A stereoscopic 3D liquid crystal display apparatus according to claim 11, wherein the segments have a converging wedge shape with the light source located at a wide side of the converging wedge.

13. A stereoscopic 3D liquid crystal display apparatus according to claim 11, wherein each light source selectively transmits light into the light guide based upon whether a right or left image is displayed on the liquid crystal display panel.

14. A stereoscopic 3D liquid crystal display apparatus according to claim 11, wherein each light source is turned on or off in an alternating order between the first and second sides and the light sources are located on opposing first and second sides of each pair of adjacent segments.

15. A stereoscopic 3D liquid crystal display apparatus according to claim 11, further comprising a synchronization driving element electrically coupled to the light sources and the synchronization driving element synchronizes turning each segment on or off in an alternating order between the first and second sides.

16. A stereoscopic 3D liquid crystal display apparatus according to claim 11, wherein each segment is partially separated from an adjacent segment by an air gap and the each segment is joined with an adjacent segment at the first planar surface, or second planar surface, or between the first planar surface and second planar surface.

17. A stereoscopic 3D liquid crystal display apparatus according to claim 11, wherein each segment is completely separated from an adjacent segment.

18. A stereoscopic 3D liquid crystal display apparatus according to claim 11, wherein the plurality of segments comprise elongated rods.

19. A stereoscopic 3D liquid crystal display apparatus according to claim 11, wherein each light source comprises a one or more light emitting diodes.

20. A stereoscopic 3D liquid crystal display apparatus according to claim 11, wherein each segment first or second side has a length and a width, or diameter value of 2 millimeters or less.

* * * * *